(12) United States Patent
Cullen et al.

(10) Patent No.: US 6,347,476 B1
(45) Date of Patent: Feb. 19, 2002

(54) LAUNCHING DEVICE FOR TRAINING RETRIEVING DOGS

(76) Inventors: Bernard Tedford Cullen, P.O. Box 577, LaSalle, Manitoba (CA), R0G 1B0; Wayne Seyman Lewis, Box 133, St. Germain, Manitoba (CA)

( * ) Notice: Subject to any disclaimer, the term of this patent is extended or adjusted under 35 U.S.C. 154(b) by 0 days.

(21) Appl. No.: 09/391,499

(22) Filed: Sep. 8, 1999

Related U.S. Application Data

(60) Provisional application No. 60/099,532, filed on Sep. 9, 1998.

(51) Int. Cl.[7] .......................... F41C 27/06; A01K 15/04
(52) U.S. Cl. ......................................... 42/105; 119/720
(58) Field of Search .................................. 42/105; 89/7

(56) References Cited

U.S. PATENT DOCUMENTS

| | | | | |
|---|---|---|---|---|
| 4,307,529 A | * | 12/1981 | White et al. | 42/1 F |
| 4,341,030 A | * | 7/1982 | Little | 42/1 F |
| 5,983,551 A | * | 11/1999 | Lalor | 42/105 |

* cited by examiner

Primary Examiner—Charles T. Jordan
Assistant Examiner—Nicholas W. Dicostanzo
(74) Attorney, Agent, or Firm—Adrian D. Battison

(57) ABSTRACT

A launching device for training dogs to retrieve comprising a plurality of projectiles arranged to be launched by the launching device of the type which can be retrieved by the dog, a projectile mount arranged to support the plurality of projectiles such that the plurality of projectiles can be positioned one at a time to be launched automatically, a gas chamber wherein the gas is arranged to produce a force to launch the projectile, an actuating arrangement to actuate the gas in the gas chamber, at least one gas supply container for supplying the gas to the chamber, a remote operating means to launch the projectiles from a distance and a valve arrangement for controlling the amount of gas entering the gas chamber. The projectile mount is on a shaft having an axis in which the projectile mount can rotate. A motor is arranged to drive the shaft about the axis. A disk is mounted at a respective end of the shaft arranged to rotate about the axis. A plurality of engaging members are on an outer edge of the disk for engaging a switch. The switch is arranged to stop rotation of the motor such that the projectile is in position to be launched. The switch defines the actuating arrangement such that when the engaging members engage the switch the flow of gas to the gas chamber is stopped and ignited. The actuating arrangement has a sparking device defining a spark plug mounted on the gas chamber for igniting the gas and the sparking device is actuated by the switch when engaged by the engaging member.

14 Claims, 4 Drawing Sheets

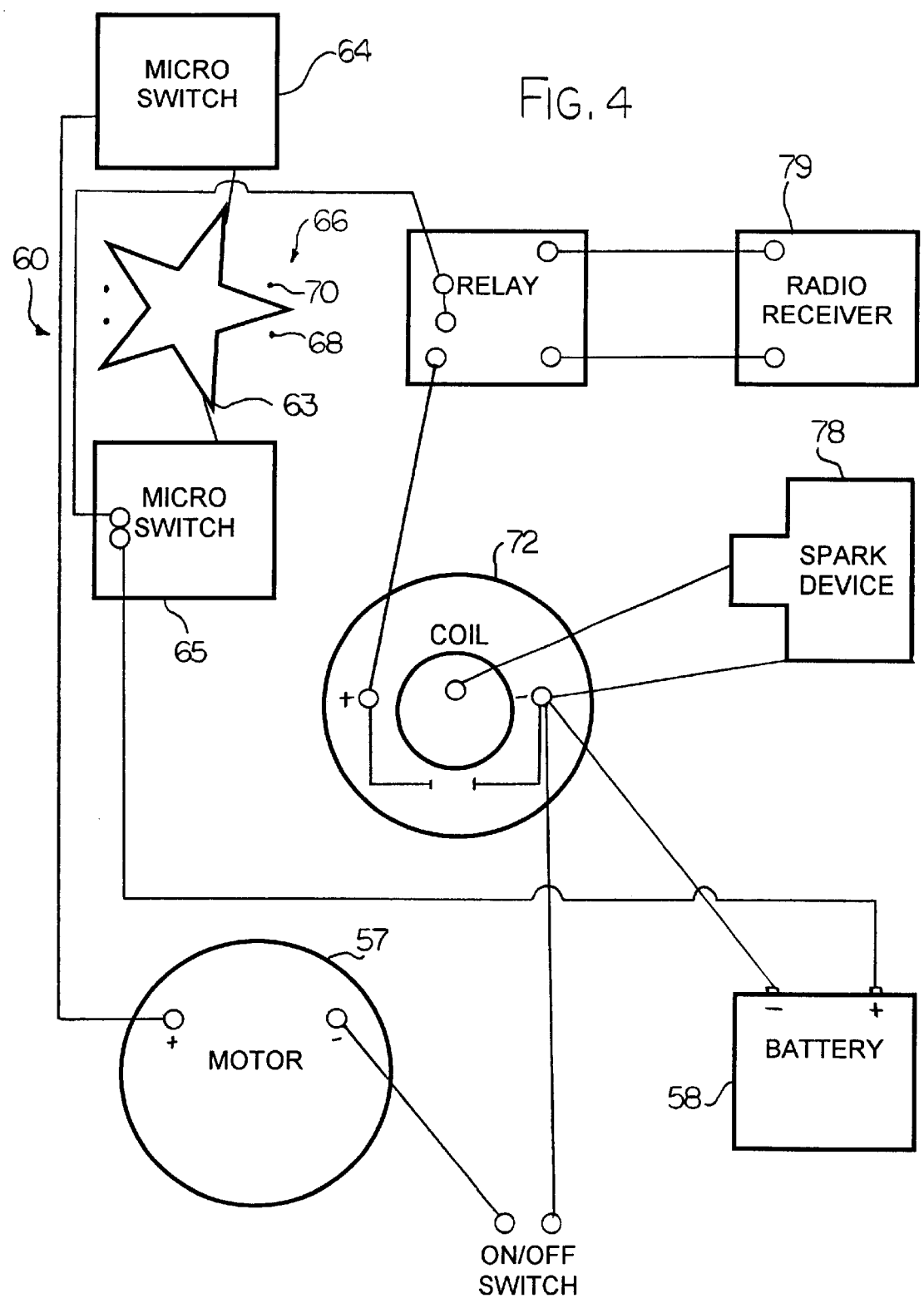

LAUNCHING DEVICE FOR TRAINING RETRIEVING DOGS

This application claims benefit of Provisional No. 60/099,532 filed Sep. 9, 1998.

FIELD OF INVENTION

The present invention relates to a launching device for training retriever dogs and the like. The present invention uses a combination of gases to launch a projectile into the air using a remote control device.

BACKGROUND OF THE INVENTION

When training a dog, the trainer needs someone to shoot a gun and throw an object into the air, usually taking up time, energy and money. Currently a dog training apparatus which fires projectiles into the air uses blank cartridges, such as ones used in guns and the like, or gases for firing a projectile into the air. This method is effective but is time consuming in that each time the apparatus needs to be reloaded a new blank cartridge has to be installed in place of the used one, such methods can prove to be dangerous and the projectile must be replaced each time when fired. An example of the above apparatus is disclosed in U.S. Pat. No. 4,307,529 (White et al) which discloses a remote control dummy launcher or bumper launcher for training retrieving dogs, which allows a trainer to launch a dummy from the device. The device is disclosed as using a gas which fires a single dummy but is not reloading such that a second dummy can be fired without the trainer having to put on a second dummy.

SUMMARY OF THE INVENTION

The present invention is arranged to launch a number of projectiles one at a time into the air at different positions in a field or the like, allowing the trainer to train a dog in a shorter period of time and using less energy.

According to one aspect of the invention there is provided a launching device for training dogs to retrieve comprising:
  a plurality of projectiles arranged to be launched by the launching device of the type which can be retrieved by the dog;
  a projectile mount arranged to support the projectiles such that the projectiles can be positioned one at a time to be launched automatically;
  a gas chamber wherein the gas is arranged to produce a force to launch the projectile;
  an actuating arrangement to actuate the gas in the gas chamber;
  at least one gas supply container for supplying the gas to the chamber;
  a remote operating means to launch the projectiles from a distance;
  and a valve arrangement for monitoring the amount of gas entering the gas chamber.

Preferably the projectile mount is on a shaft having an axis in which the projectile mount can rotate and drive by a motor, wherein a disk is mounted at a respective end of the shaft arranged to rotate about the axis, wherein a plurality of engaging members are on an outer edge of the disk for engaging a switch, wherein the switch is arranged to stop rotation of the motor such that the projectile is in position to be launched, wherein the switch defines the actuating arrangement such that when the engaging members engage the switch the flow of gas to the gas chamber is stopped and ignited, wherein the actuating arrangement has a sparking device mounted on the gas chamber for igniting the gas;
  the sparking device is actuated by the switch when engage by the engaging member.

Preferably the gas is a combination of oxygen and propane in separate supply containers.

Preferably the remote operating means is arranged to start rotating of the shaft.

One embodiment of the invention will now be described in conjunction with the accompanying drawings in which:

BRIEF DESCRIPTION OF THE DRAWINGS

FIG. 4 is a schematic diagram of the electrical circuit used in the present invention.

In the drawings like characters of reference indicate corresponding parts in the different figures.

DETAILED DESCRIPTION

Figure 1:
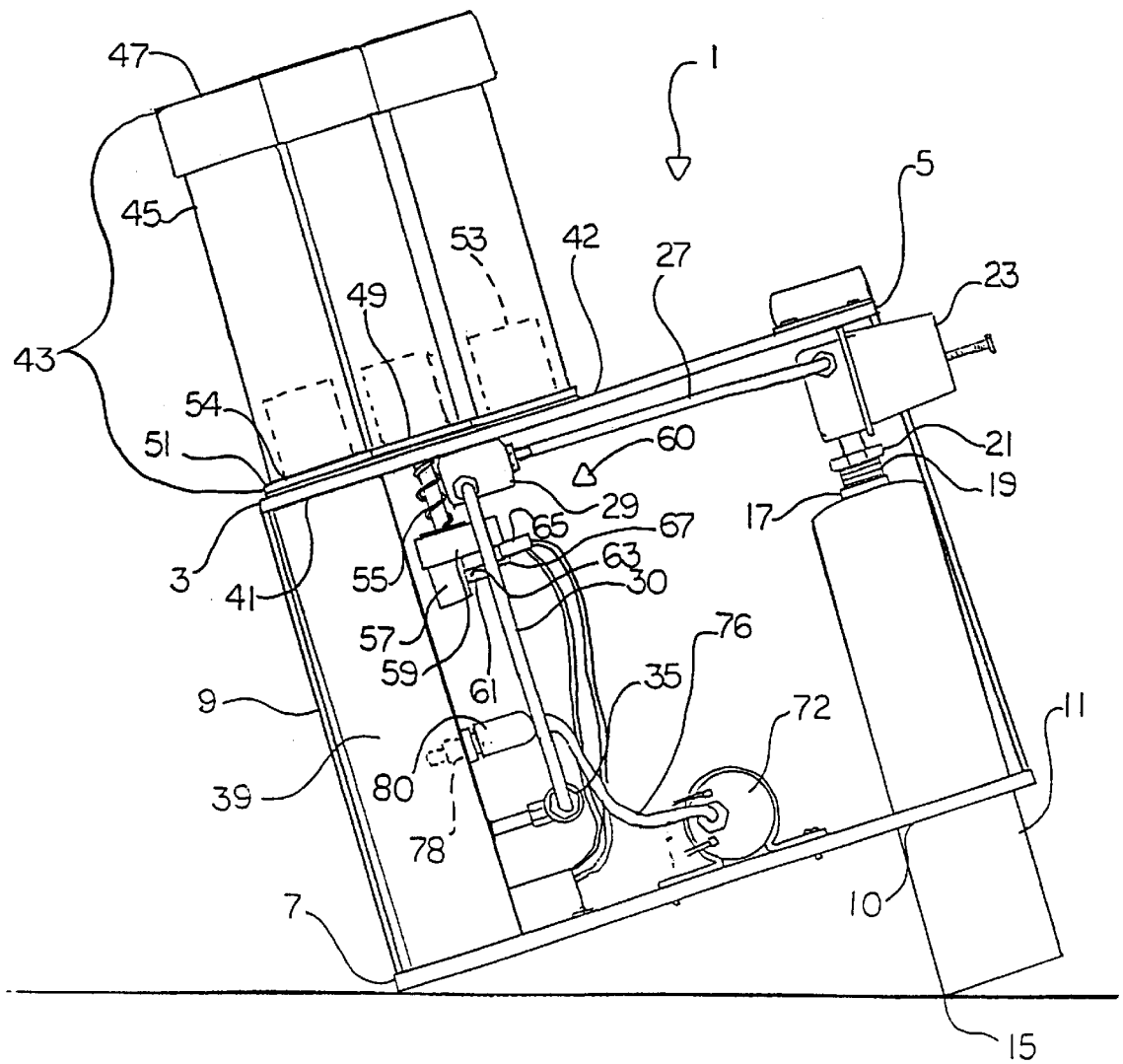
FIG. 1 is a side elevational view of the present invention.
Figure 2:
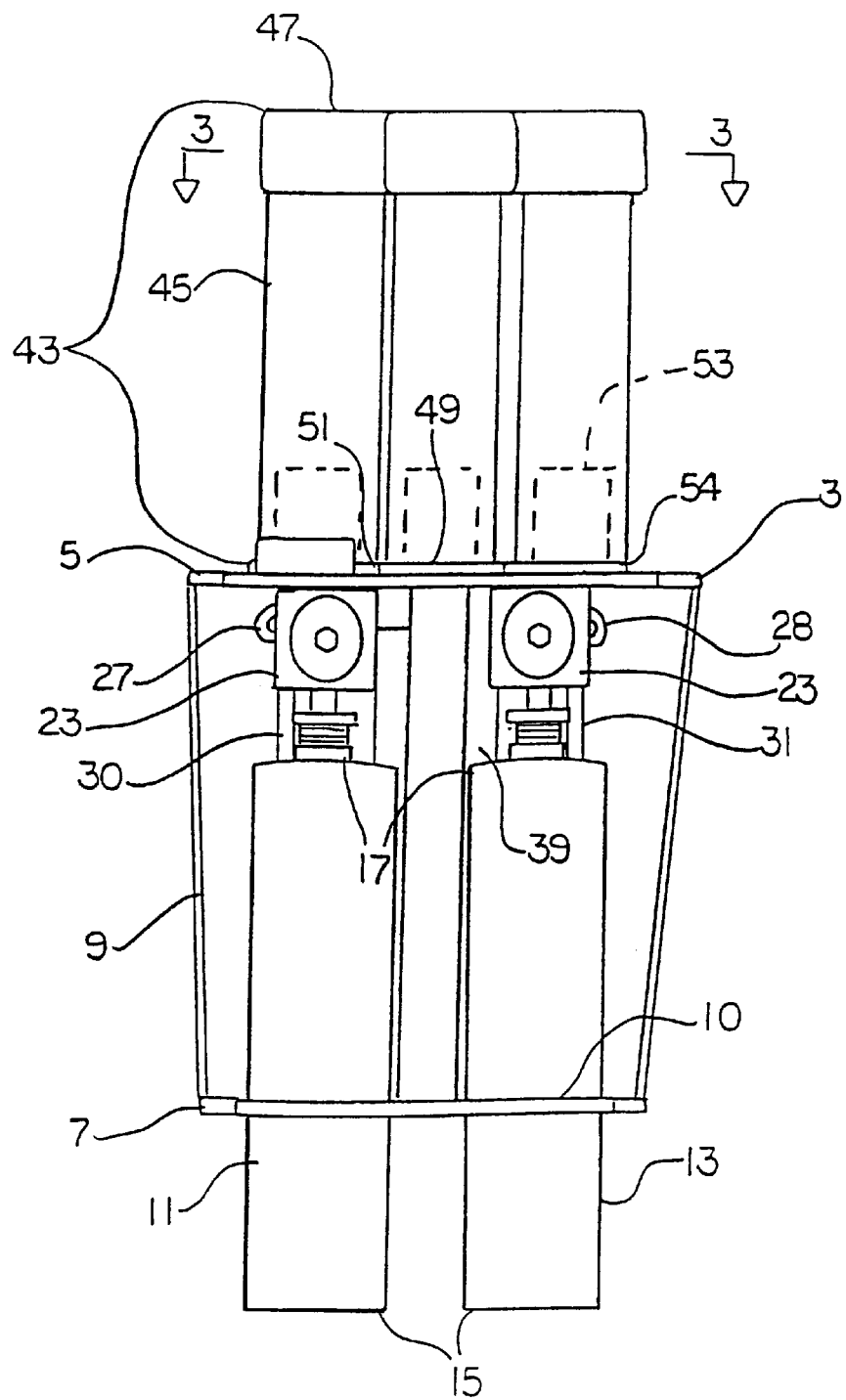
FIG. 2 is a rear view of the present invention.
Figure 3:
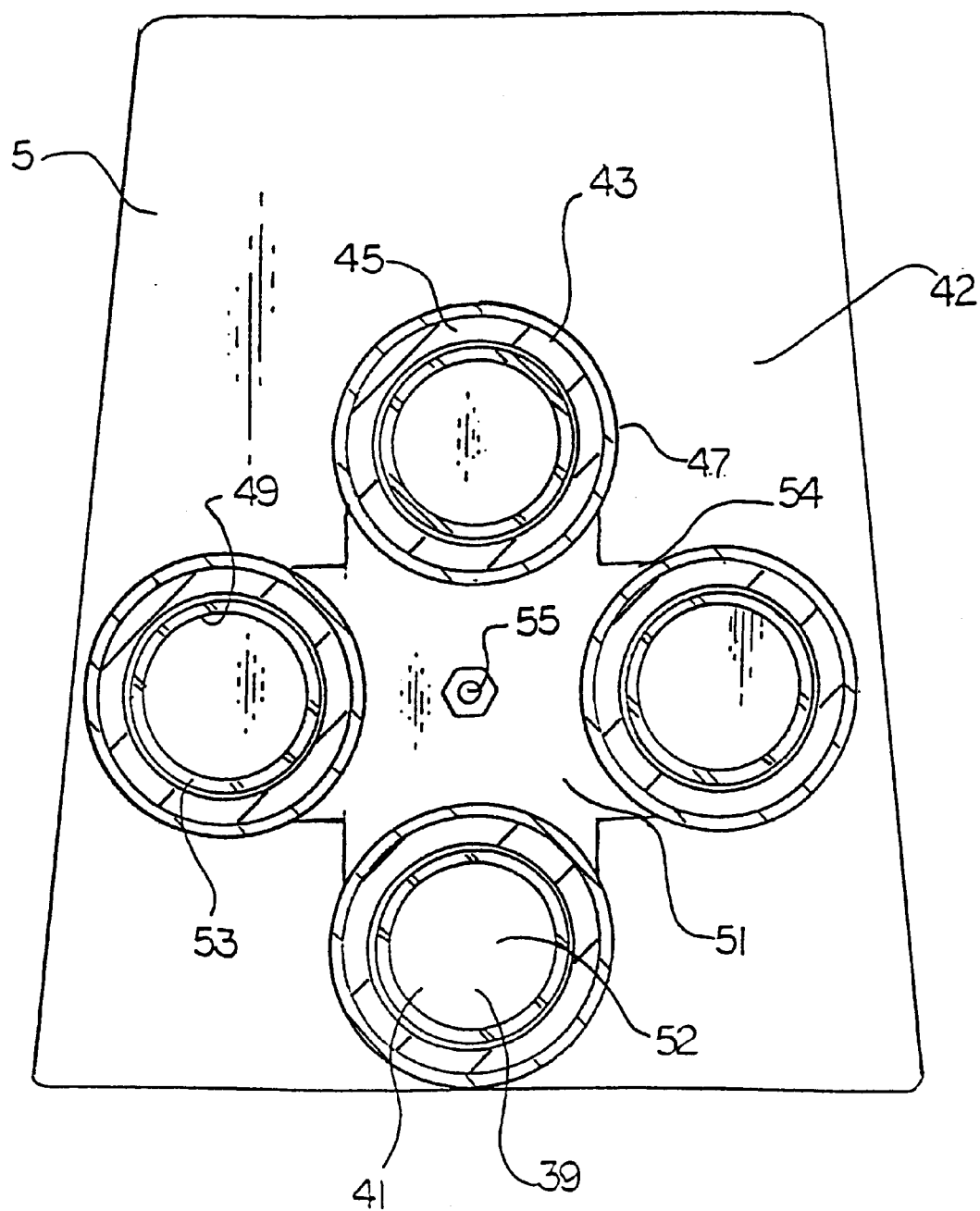
FIG. 3 is a cross sectional view along the lines 3—3 of FIG. 2.

A launching device 1 for training dogs to retrieve has a frame 3 having a front portion 5 which is parallel to a rear portion 7 and cross beams 9 extending from the front and rear portion for support. A pair of adjacent holes 10 on the rear portion 7 are arranged to hold a pair of tanks 11 and 13.

The tanks 11 and 13 are cylindrical in shape and are constructed to contain gases such as oxygen and propane. The oxygen being contained in the first tank 11 and the propane being contained in the separate second tank 13. A ground engaging end 15 at the rear most end of the tanks is arranged to engage the ground for supporting the launching device at an incline. The tanks extend at an incline parallel forward wherein an attached end 17 on the respective tanks at the forward most end has threads 19 arranged to be screwed into a nut 21 on a regulator 23 and 24. The regulators 23 and 24 are mounted on the front portion 5 of the frame 3 and are arranged to maintain pressure in the tanks and to control the flow of the gases.

The first regulator 23 is attached to the first tank 11 which holds the oxygen and the second regulator 24 is attached to the second tank 13 which holds the propane. A first gas line 27 extends outwardly from the first regulator 23 to a valve 29. A second gas line 28 extends outwardly from the second regulator 24 to the valve 29. The valve 29 maintains the separation of the gases and is arranged to stop the gases from reversing the flow backwards and has a flame resistor mechanism for safety. A third gas line 30 extends outwardly carrying oxygen from the valve 29 to a mixer coupling 35. A fourth gas line 31 extends outwardly carrying propane from the valve 29 to the mixer coupling 35. The mixer coupling 35 is arranged to safely mix the two gases. The mixer coupling is T-shaped wherein the gases enter at respective ends and flow downwardly into an ignition chamber 39. The mixer coupling allows the gases to flow separately from the tanks to the ignition chamber 39 for safety since the gases are explosive when mixed.

An ignition chamber 39 for the gases is cylindrical in shape being parallel with the tanks 11 and 13. The ignition chamber 39 has a release end 41 at the front portion 5 of the frame 3 in which a plurality of projectiles 43 are mounted and arranged to be launched one at a time.

A projectile mount plate 51 is mounted on an upper surface 42 of the front portion 5 of the frame 3 and has a plurality of mount tubes 53. The mount plate has four outer portions 54 extending outwardly from respective sides of a central shaft 55 on each having a mount tube 53 arranged for support a projectile 43. The mount tube 53 has a hollow interior 52 and is at each end.

The projectiles 43 are cylindrical in shape having a main body defining a tube 45, a cap 47 at the outermost end and an open end 49 at the mount plate 51.

The mount plate 51 is mounted on the shaft 55 for rotation about an axis of the shaft which is arranged to be driven by a motor 57. The mount plate can be rotated by the shaft for positioning of the projectiles for receiving the force from the ignition chamber 39, as described later. A motor mount 59 supports the motor 57 on the frame 3.

At the inner most end of the shaft is an actuating arrangement 60 having a disk 61 arranged to rotate about the axis, a five engage points 63, a switch 65, a second switch 64 and a series of valve actuators 66. The engage points 63 are arranged to be rotated about the axis by the motor 57 such that a pair of release valve actuators 68 are engaged. The release valve actuators 66 signal the valves 29 to release the gases from a respective tank 11, 13 into the mixer coupling 35. As the engage points 63 disengage the release valve actuators 66 the points 63 continue movement to a second valve actuator 70. The second valve actuator 70 opens the ignition chamber 39 such that the gases mixed within the coupler enter the ignition chamber. The points 63 disengage the actuator and engage the first and second switches 65, 64 simultaneously. The first switch 65 actuates the coil to ignite the sparking device 78 and the second switch 64 stops the motor.

An igniting arrangement has a coil 72 which is mounted on the rear portion 7 of the frame 3. An ignition wire 76 extends downwardly to a igniting means defining the sparking device 78 which can be a spark plug. The sparking device 78

In operation, the operator uses a remote control 79, shown schematically in FIG. 4, to begin the driving of the motor 57 by the battery 58. As the motor turns the mount plate the gases are released into the chamber. When the engaging points 63 on the disk 61, defining a cam, engage the switch 64, the motor 57 and the flow of gas is stopped. The projectile covering the release end 41 is now in position and the switch 65 sends a signal to the coil 72 to fire the sparking device 78 which then ignites the gas in the chamber creating a force which launches the projectile away from the device into the air for retrieval by the dog. When the remote 79 is actuated the process is repeated bringing the next projectile into position for launching.

The gas in the chamber can consist of any of the volatile gases which can create a force strong enough to fire the projectile and have a loud enough bang to simulate a gun firing.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A launching device for training dogs to retrieve comprising:
    a plurality of projectiles arranged to be launched and arranged to be retrieved by the dog;
    a projectile mount arranged to support the plurality of projectiles such that the plurality of projectiles can be positioned one at a time to be launched automatically;
    a gas chamber wherein the gas is arranged to produce a force to launch the projectile;
    an actuating arrangement to actuate the gas in the gas chamber;
    at least one gas supply container for supplying the gas to the chamber;
    a valve arrangement for controlling the amount of gas entering the gas chamber;
    and a remote operating means for operating the valve and the actuating arrangement to launch the projectiles from a distance.

2. The device according to claim 1 wherein the projectile mount includes a shaft having an axis about which the projectile mount can rotate driven by a motor to move each projectile in turn to said gas chamber for launching.

3. The device according to claim 2 wherein the projectile mount includes a disk which is mounted at a respective end of the shaft arranged to rotate with the shaft about the axis, the disk having a plurality of engaging members on the disk for engaging a switch arranged to stop rotation of the motor such that the projectile is in position to be launched and to effect operation of said actuating arrangement.

4. The device according to claim 1 wherein the actuating arrangement has a sparking device defining a spark plug mounted on the gas chamber for igniting the gas.

5. The device according to claim 1 wherein the gas is a combination of oxygen and a combustible gas and wherein the at least one gas supply container includes two separate supply containers.

6. The device according to claim 2 wherein the remote operating means is arranged to start rotation of the shaft.

7. A launching device for training a dog to retrieve and arranged to launch each of a plurality of projectiles one at a time for retrieval by the dog, the device comprising:
    a projectile mount arranged to support each of the plurality of projectiles at spaced positions thereon;
    a gas chamber arranged to produce a force to launch each projectile in turn;
    at least one gas supply container for supplying a gas to the chamber;
    an actuating arrangement to cause the gas in the gas chamber to generate said force;
    the projectile mount being movable by a motor such that each of the plurality of projectiles in turn can be moved to a position at the gas chamber to be launched one at a time;
    and a remote operating means arranged from a distance to cause operation of the motor and the actuating arrangement to launch the projectiles.

8. The device according to claim 7 wherein the projectile mount comprises a member which is mounted on a shaft arranged to rotate with the shaft about an axis of the shaft, the member having a plurality of contact elements thereon for engaging a switch arranged to stop rotation of the motor such that the projectile is in position to be launched and to effect operation of said actuating arrangement.

9. The device according to claim 7 wherein the actuating arrangement has a sparking device defining a spark plug mounted on the gas chamber for igniting the gas.

10. The device according to claim 7 wherein the gas is a combination of oxygen and a combustible gas and wherein the at least one gas supply container includes two separate supply containers.

11. The device according to claim 8 wherein the remote operating means is arranged to start rotation of the shaft.

12. A launching device for training a dog to retrieve and arranged to launch each of a plurality of projectiles one at a time for retrieval by the dog, the device comprising:

a projectile mount arranged to support each of the plurality of projectiles at spaced positions thereon;

a gas chamber arranged to produce a force to launch each projectile in turn;

at least one gas supply container for supplying a combustible gas to the chamber;

a valve for controlling supply of a required amount of the combustible gas from the supply container to the chamber, an igniting arrangement to cause the combustible gas in the gas chamber to generate said force;

and a remote operating means arranged from a distance to cause operation of the igniting arrangement to launch the projectiles.

13. The device according to claim 11 wherein the igniting arrangement has a sparking device defining a spark plug mounted on the gas chamber for igniting the gas.

14. The device according to claim 11 wherein the gas is a combination of oxygen and a combustible gas and wherein the at least one gas supply container includes two separate supply containers.

* * * * *